(No Model.)

A. M. BRYSON.
COMBINED POTATO PLANTER AND TRANSPLANTER.

No. 557,483. Patented Mar. 31, 1896.

Witnesses
Geo. O. Willet
Frank A. Olds

Inventor
Ambrose M. Bryson
by
Wm. H. Monroe
Attorney

UNITED STATES PATENT OFFICE.

AMBROSE M. BRYSON, OF MENTOR, OHIO.

COMBINED POTATO PLANTER AND TRANSPLANTER.

SPECIFICATION forming part of Letters Patent No. 557,483, dated March 31, 1896.

Application filed March 23, 1895. Serial No. 542,994. (No model.)

*To all whom it may concern:*

Be it known that I, AMBROSE M. BRYSON, a citizen of the United States, and a resident of Mentor, county of Lake, State of Ohio, have invented certain new and useful Improvements in a Combined Potato Planter and Transplanter, of which I hereby declare the following to be a full, clear, and exact description, such as will enable others skilled in the art to which it appertains to make and use the same.

My invention relates to improvements in agricultural implements, and the objects are to combine with a simple form of hand potato-planter an efficient plant-transplanter.

The invention consists in pivoted jaws and handles and removable tube, with the details of construction and manner of arrangement of the various parts, as hereinafter described, shown in the accompanying drawings, and more specifically pointed out in the claim.

Figure 1:
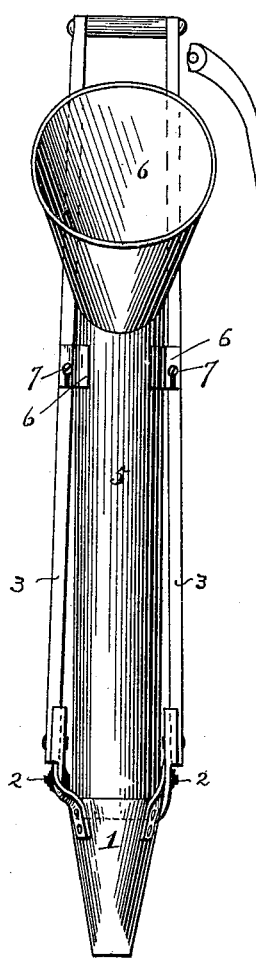
Figure 3:
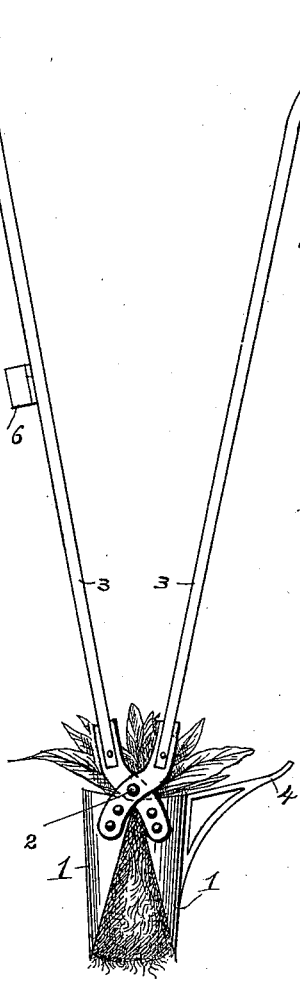
Figure 2:
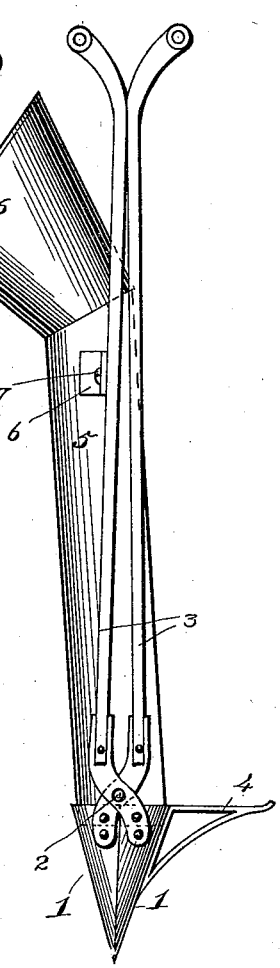

In the accompanying drawings, Figure 1 is a front view of the complete device. Fig. 2 is a side view with tube removed, and Fig. 3 shows the adaptation to use as a plant-transplanter.

In the figures, 1 1 are curved blades which when closed together form a wedge-shaped depositor which can be forced into the soil to insert the potato-seed. The blades 1 are pivotally secured together by the pin 2, connecting the crossed handles 3, so that the blades will be opened as the handles are separated and so drop out the seed. A foot-rest 4 is added at one side to force the depositor into the ground when it is hard.

5 is a feed-tube provided with a flaring opening 6, into which the potato-seed is thrown and through which it passes to the curved blades. This tube is removably secured to the handles connected with one of the blades by means of slotted keepers 7 and pins 8.

When the feeding-tube has been removed, the curved blades and handles form a tool for transplanting plants, (used in the manner seen in Fig. 3,) the blades being first widely opened for insertion into the earth about the plant and then brought together slightly below the roots of the plant, so that the plant and earth about the roots can be lifted entirely out.

The advantages of this device are obvious, since it is simple, easily constructed, and quickly used for either purpose, as desired.

Having described my invention, what I claim as new, and desire to secure by Letters Patent, is—

The combination in a combined potato-planter and plant-transplanter, of two blades forming a wedge-shaped depositor, cross-handles having their lower ends secured thereto, and pivoted together near said blades, a feed-tube detachably secured between one of the sets of handles and at one side of the implement, substantially as described and set forth.

In testimony whereof I hereunto set my hand this 21st day of February, 1895.

AMBROSE M. BRYSON.

Witnesses:
WM. M. MONROE,
C. H. OLDS.